United States Patent
Chen et al.

(10) Patent No.: US 9,838,860 B2
(45) Date of Patent: Dec. 5, 2017

(54) METHODS FOR EFFICIENT WIRELESS COMMUNICATIONS AND COMMUNICATIONS APPARATUS UTILIZING THE SAME

(71) Applicant: MediaTek Inc., Hsin-Chu (TW)

(72) Inventors: Tuan-Che Chen, Taichung (TW); Chin-Han Wang, Taipei (TW); Lu-Tsung Chang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 54 days.

(21) Appl. No.: 14/991,443

(22) Filed: Jan. 8, 2016

(65) Prior Publication Data

US 2016/0212603 A1    Jul. 21, 2016

Related U.S. Application Data

(60) Provisional application No. 62/103,707, filed on Jan. 15, 2015.

(51) Int. Cl.
| | |
|---|---|
| *H04W 4/22* | (2009.01) |
| *H04W 72/10* | (2009.01) |
| *H04W 48/14* | (2009.01) |
| *H04W 76/00* | (2009.01) |
| *H04W 76/02* | (2009.01) |

(52) U.S. Cl.
CPC ............ *H04W 4/22* (2013.01); *H04W 48/14* (2013.01); *H04W 76/007* (2013.01); *H04W 76/027* (2013.01)

(58) Field of Classification Search
CPC ... H04W 4/22; H04W 76/007; H04W 76/027; H04W 48/14
See application file for complete search history.

(56) References Cited

U.S. PATENT DOCUMENTS

| | | | |
|---|---|---|---|
| 2007/0049269 A1* | 3/2007 | Ophir | H04W 8/06 455/432.1 |
| 2008/0102784 A1* | 5/2008 | Mittal | H04M 11/04 455/404.1 |
| 2009/0086672 A1* | 4/2009 | Gholmieh | H04W 48/14 370/329 |
| 2010/0216465 A1* | 8/2010 | Mubarek | H04W 48/18 455/435.1 |
| 2012/0077456 A1* | 3/2012 | Tiwari | H04W 48/16 455/404.1 |
| 2013/0017826 A1* | 1/2013 | Bergquist | H04W 12/08 455/426.1 |
| 2015/0056944 A1* | 2/2015 | Bhatiya | H04M 1/72538 455/404.1 |

* cited by examiner

*Primary Examiner* — Kashif Siddiqui
*Assistant Examiner* — Minjung Kim
(74) *Attorney, Agent, or Firm* — McClure, Qualey & Rodack, LLP

(57) ABSTRACT

A method for efficient wireless communications performed by a communications apparatus includes determining a cell according to a low priority list; and performing an attach procedure to try to attach to the cell for establishing an emergency call through the cell. The low priority list comprises information regarding a public land mobile network (PLMN) identity (ID), tracking area (TA) code, a cell ID and/or a closed subscriber group (CSG) ID of at least one attempted cell through which the communications apparatus has attempted but failed to establish an emergency call.

18 Claims, 11 Drawing Sheets

METHODS FOR EFFICIENT WIRELESS COMMUNICATIONS AND COMMUNICATIONS APPARATUS UTILIZING THE SAME

CROSS REFERENCE TO RELATED APPLICATIONS

This application claims the benefit of U.S. Provisional Application No. 62/103,707 filed on 2015 Jan. 15 and entitled "Maintain black lists for emergency attach", the entire contents of which are hereby incorporated by reference.

BACKGROUND OF THE INVENTION

Field of the Invention

The invention relates to methods for efficient wireless communications.

Description of the Related Art

The term "wireless" normally refers to an electrical or electronic operation, which is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network. The Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements.

In order to provide more efficient communications services, methods for efficient wireless communications are provided.

BRIEF SUMMARY OF THE INVENTION

Methods for efficient wireless communications and communications apparatuses are provided. An exemplary embodiment of a communications apparatus comprises a radio transceiver and a processor. The radio transceiver transmits or receives wireless radio frequency signals. The processor determines a cell according to a low priority list and performing an attach procedure via the radio transceiver to try to attach to the cell for establishing an emergency call through the cell. The low priority list comprises information regarding a public land mobile network (PLMN) identity (ID), a tracking area (TA) code, a cell ID and/or a closed subscriber group (CSG) ID of at least one attempted cell through which the processor has attempted but failed to establish an emergency call.

An exemplary embodiment of a method for efficient wireless communications performed by a communications apparatus comprises determining a cell according to a low priority list; and performing an attach procedure to try to attach to the cell for establishing an emergency call through the cell. The low priority list comprises information regarding a public land mobile network (PLMN) identity (ID), tracking area (TA) code, a cell ID and/or a closed subscriber group (CSG) ID of at least one attempted cell through which the communications apparatus has attempted but failed to establish an emergency call.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
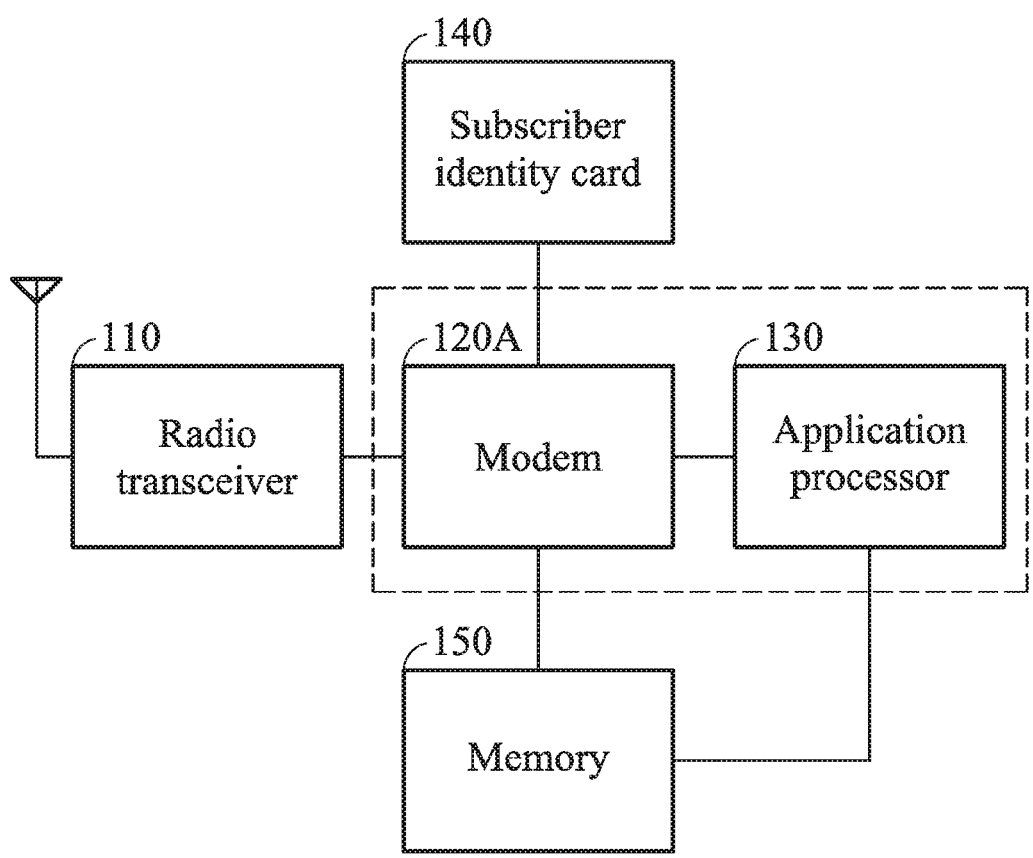
FIG. 1A shows an exemplary block diagram of a communications apparatus according to an embodiment of the invention.

FIG. 1A shows an exemplary block diagram of a communications apparatus according to an embodiment of the invention. The communications apparatus 100A may be a portable electronic device, such as a mobile station (MS, which may be interchangeably referred to as user equipment (UE)). The communications apparatus 100A may comprise at least an antenna module comprising at least one antenna, a radio transceiver 110, a modem 120A, an application processor 130, a subscriber identity card 140, and a memory 150. The radio transceiver 110 may receive wireless radio frequency signals via the antenna module, transmit wireless radio frequency signals via the antenna module and perform RF signal processing. For example, the radio transceiver 110 may convert the received signals to intermediate frequency (IF) or baseband signals to be processed, or receive the IF or baseband signals from the modem 120A and convert the received signals to wireless radio frequency signals to be transmitted to a network device. According to an embodiment of the invention, the network device may be a cell, an evolved node B, a base station, etc., at the network side and communicating with the communications apparatus 100A via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portion in the RF signals and/or a mixer for performing radio frequency conversion. According to an embodiment of the invention, the radio frequency may be, for example, 900 MHz or 1800 MHz for a global system for mobile communication (GSM), or 1900 MHz for a Universal Mobile Telecommunications System (UMTS), or the frequency of any specific frequency band for a Long-Term Evolution (LTE) system, etc.

The modem 120A may be a cellular communications modem configured for handling cellular system communications protocol operations and processing the IF or baseband signals received from or to be transmitted to the radio transceiver 110. The application processor 130 is configured for running the operating system of the communications apparatus 100A and running application programs installed in the communications apparatus 100A. In the embodiments of the invention, the modem 120A and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an international mobile subscriber identity (IMSI) and a set of SIM application toolkit (SAT) commands and may provide storage space for phone book contacts. The memory 150 may be coupled to the modem 120A and application processor 130 and may store system data or user data.

FIG. 1A shows a case of single-card single-standby application. With advancements in communications techniques, communications apparatuses are now capable of supporting multi-card multi-standby application and handling multi-RAT (radio access technology) operations, such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or the like via one communications apparatus.

Figure 1B:
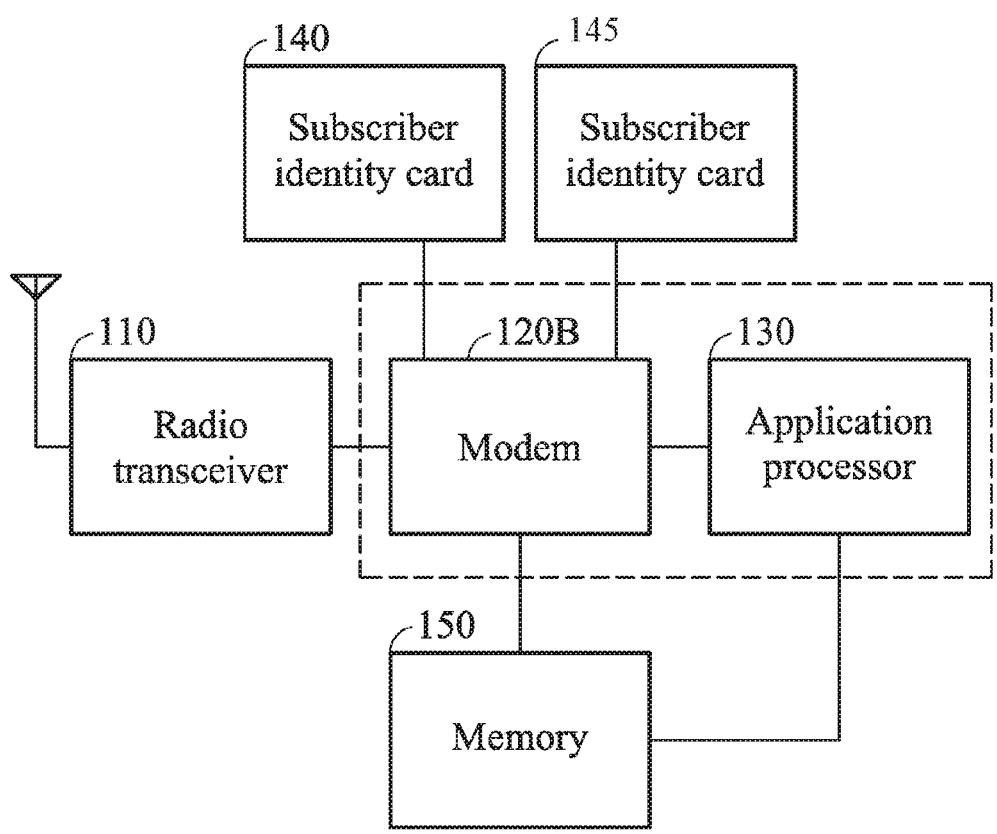
FIG. 1B shows an exemplary block diagram of a communications apparatus according to another embodiment of the invention.

FIG. 1B shows an exemplary block diagram of a communications apparatus according to another embodiment of the invention. Most of the elements shown in FIG. 1B are similar to FIG. 1A, and thus the descriptions are omitted here for brevity. In this embodiment, the communications apparatus 100B may comprise multiple subscriber identity cards 140 and 145 coupled to the modem 120B, thereby the modem 120B may at least support two RATs communications, wherein the two RATs may be different RATs or the same RAT, and the invention should not be limited to either case.

According to an embodiment of the invention, the modem 120B, the radio transceiver 110 and/or the antenna module may be shared by subscriber identity cards 140 and 145 to support at least two RATs communications. Therefore, in this embodiment, the communications apparatus 100B may be regarded as comprising at least two communications units, one may at least comprise the subscriber identity card 140, (all or part of) the modem 120B, the radio transceiver 110 and the antenna module, and another one may at least comprise the subscriber identity card 145, (all or part of) the modem 120B, the radio transceiver 110 and the antenna module.

According to an embodiment of the invention, the modem 120B may have the capability of handling the operations of multiple cellular system communications protocols and processing the IF or baseband signals for the corresponding communications units. Each communications unit may operate independently at the same time in compliance with a corresponding communications protocol, and thereby the communications apparatus 100B can support a multi-card multi-standby application.

Note that, in order to clarify the concept of the invention, FIG. 1A and FIG. 1B present simplified block diagrams in which only the elements relevant to the invention are shown. For example, in some embodiments of the invention, the communications apparatus may further comprise some peripheral devices not shown in FIG. 1A and FIG. 1B. In another example, in some embodiments of the invention, the communications apparatus may further comprise a central controller coupled to the modem 120A/120B and the application processor 130. Therefore, the invention should not be limited to what is shown in FIG. 1A and FIG. 1B.

Note further that subscriber identity cards 140 and 145 may be dedicated hardware cards as described above, or in some embodiments of the invention, there may be individual identifiers, numbers, addresses, or the like which are burned in the internal memory device of the corresponding modem and are capable of identifying the individual communications entity that the corresponding communications unit operates. Therefore, the invention should not be limited to what is shown in the figures.

Note further that although communications apparatuses 100B shown in FIG. 1B support two RAT wireless communications services, the invention should not be limited thereto. Those who are skilled in this technology can still make various alterations and modifications based on the descriptions given above to derive the communications apparatuses capable of supporting more than two RAT wireless communications without departing from the scope and spirit of this invention.

Note further that, although in FIG. 1B, the radio transceiver 110 and the antenna module are shared by multiple communications units, the invention should not be limited thereto. Those who are skilled in this technology can still make various alterations and modifications based on the descriptions given above to derive the communications apparatuses comprising multiple radio transceivers and/or multiple antenna modules for supporting multiple RAT wireless communications without departing from the scope and spirit of this invention.

Figure 2:
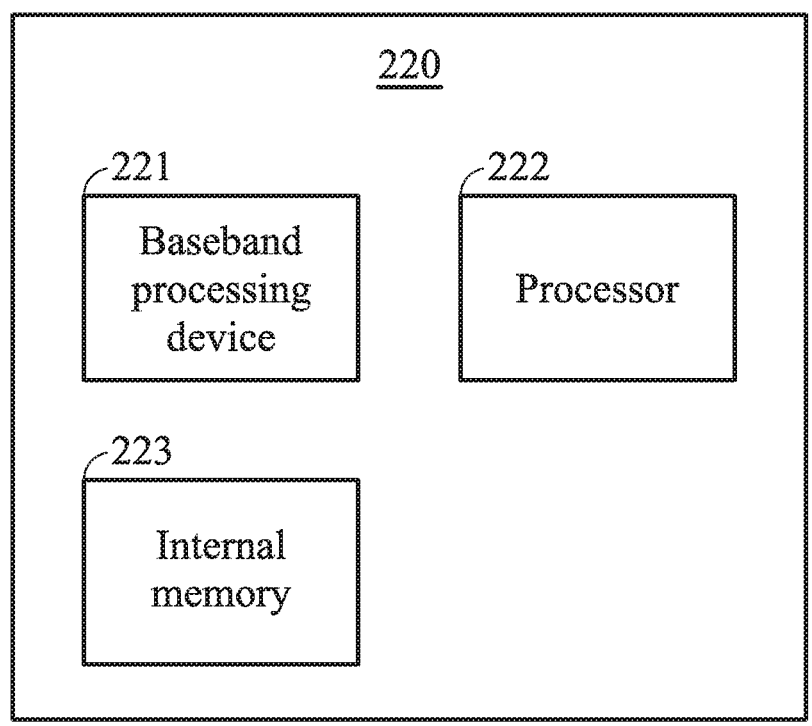
FIG. 2 shows an exemplary block diagram of a modem according to an embodiment of the invention.

FIG. 2 shows an exemplary block diagram of a modem according to an embodiment of the invention. The modem 220 may be the modem 120A or 120B shown in FIG. 1A and FIG. 1B and may comprise at least a baseband processing device 221, a processor 222 and an internal memory 223. The baseband processing device 221 may receive the IF or baseband signals from the radio transceiver 110 and perform IF or baseband signal processing. For example, the baseband processing device 221 may convert the IF or baseband signals to a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, a encoder for signal encoding, a decoder for signal decoding, and so on.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140 and/or 150, and write data to the subscriber identity card. The internal memory 223 may store system data and user data for the modem 220. The processor 222 may also access the internal memory 223.

Note that, in order to clarify the concept of the invention, FIG. 2 presents simplified block diagrams in which only the elements relevant to the invention are shown. Therefore, the invention should not be limited to what is shown in FIG. 2.

Note further that in some embodiments of the invention, the modem may comprise more than one processor and/or more than one baseband processing device. For example, the modem may comprise multiple processors and/or multiple baseband processing devices for supporting multi-RAT operations. Therefore, the invention should not be limited to what is shown in FIG. 2.

In some cases, a communications apparatus has to perform a cell search procedure and try attach to a cell for establishing an emergency call through the cell. According to an embodiment of the invention, when the communications apparatus (e.g. the communications apparatus 100A or 100B) has to perform a cell search procedure for establishing an emergency call, the processor (e.g. the processor 222) may inspect a low priority list to determine a cell and perform an attach procedure to try to attach to the cell for establishing an emergency call through the cell. The low priority list is built based on the results of previous attempts to establish an emergency call. The low priority list records information regarding cells that have rejected previous emergency call attempts, or information regarding cells through which the communications apparatus has previously tried but failed to establish an emergency call. Cells in the low priority list are given a lower priority than cells that are not in the low priority list. In this way, the communications apparatus may first try to attach to a cell with a higher priority to avoid another failure, and thus more efficient wireless communications services than those provided by conventional designs can be achieved. The methods for efficient wireless communications are discussed in more detail in the following paragraphs.

Note that as well-known in the art, a communications apparatus can also make an emergency call when the subscriber identity card is removed. Therefore, the proposed methods for efficient wireless communications as will be discussed below can also be applied to any communications apparatus without a subscriber identity card plugged therein, and the invention should not be limited to the communications apparatus shown in FIG. 1A and FIG. 1B.

Figure 3:
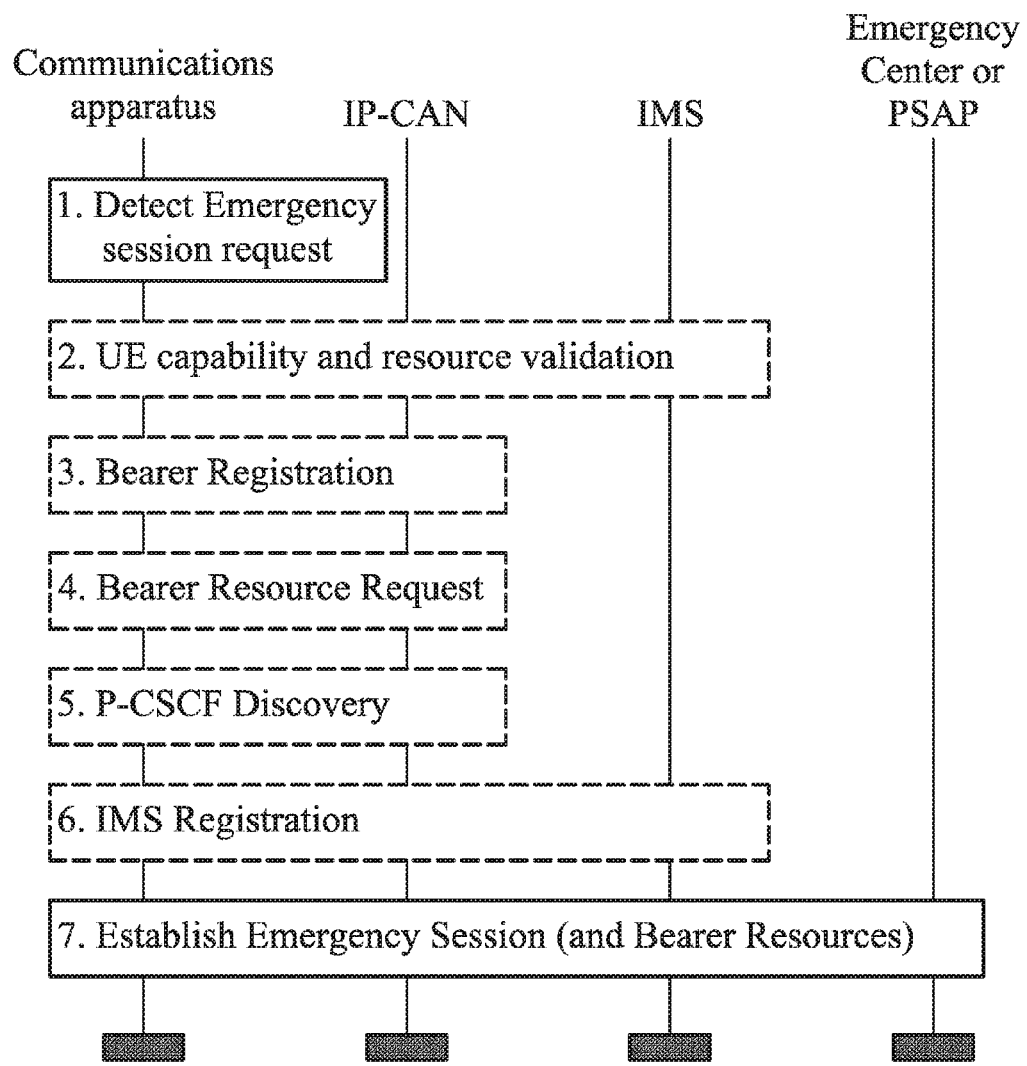
FIG. 3 is a flow chart showing high-level procedures for IP multimedia subsystem (IMS) emergency services.

FIG. 3 is a flow chart showing high-level procedures for IP multimedia subsystem (IMS) emergency services. In steps 1 and 2, the communications apparatus detects the request for the establishment of an emergency session and internally checks for the availability of establishing an emergency call. In step 3, the communications apparatus performs a normal attach procedure or an emergency attach procedure for attaching to bearer services. In cases where bearer registration is required and has not been performed, the communications apparatus shall perform bearer registration to the IP-Connectivity Access Network (IP-CAN). If the communications apparatus is already bearer registered, then the bearer registration procedures are not required. Depending on the IP-CAN, the UE may be assigned an IP address at this stage.

When the normal attach procedure succeeds, the communications apparatus establishes an emergency packet data network (PDN) connection in step 4 to request bearer resources. Note that establishment of the emergency PDN connection is included in the emergency attach procedure. When establishment of the emergency PDN connection succeeds, the communications apparatus performs a Proxy-Call Session Control Function (P-CSCF) discovery procedure and an IMS registration procedure in steps 5 and 6 for IMS emergency registration.

When the IMS emergency registration succeeds, the communications apparatus establishes the emergency session (and bearer resources) in step 7 to make an emergency call. For more details regarding the high-level procedures for IMS emergency services, reference may be made to ETSI 3GPP TS 23.167, and are omitted here for brevity.

Figure 4A:
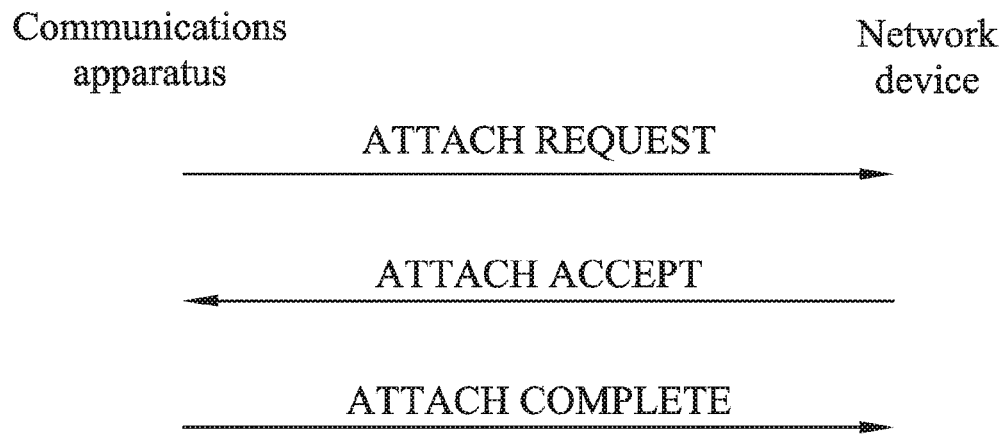
FIG. 4A is a flow chart showing a message flow for an attach procedure.

FIG. 4A is a flow chart showing a message flow for an attach procedure. In the attach procedure, the communications apparatus may transmit an attach request message to a network device, such as a mobility management entity (MME). The network device may reply by sending an attach accept message to indicate acceptance of the attach request, as shown in FIG. 4A. When receiving the attach accept message, the communications apparatus may reply by sending an attach complete message to the network device.

Figure 4B:
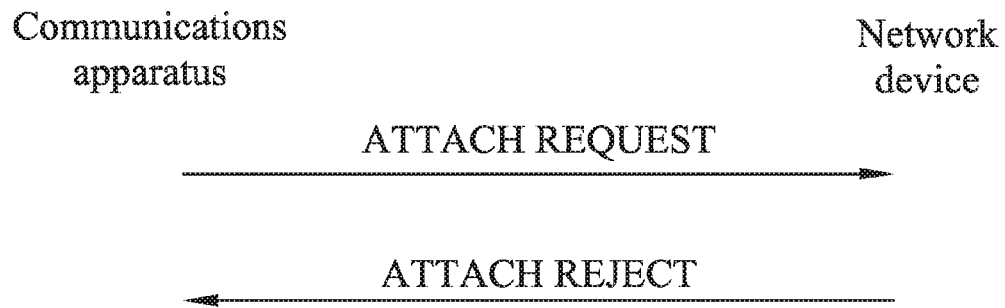
FIG. 4B is a flow chart showing another message flow for the attach procedure.

However, the attach request may be rejected by the network device. FIG. 4B is a flow chart showing another message flow for the attach procedure. As shown in FIG. 4B, the network device may reply by sending an attach reject message to indicate rejection of the attach request. The network device may carry a cause value in the attach reject message to indicate the cause of the rejection.

For example, cause #11 means that the public land mobile network (PLMN) is not allowed. This cause is sent to the communications apparatus if it requests service, or if the network initiates a detach request, in a PLMN, where the communications apparatus, by subscription or due to operator-determined barring, is not allowed to operate. In another example, cause #12 means the tracking area (TA) is not allowed. This cause is sent to the communications apparatus if it requests service, or if the network initiates a detach request, in a tracking area where the HPLMN determines that the communications apparatus, by subscription, is not allowed to operate. In another example, cause #13 means roaming is not allowed in this tracking area. This cause is sent to a communications apparatus which requests service, or if the network initiates a detach request, in a tracking area of a PLMN which by subscription offers roaming to that communications apparatus but not in that tracking area. In another example, cause #14 means EPS services are not allowed in this PLMN. This cause is sent to the communications apparatus which requests service, or if the network initiates a detach request, in a PLMN which does not offer roaming for EPS services to that communications apparatus. In another example, cause #15 means there are no suitable cells in the tracking area. This cause is sent to the communications apparatus if it requests service, or if the network initiates a detach request, in a tracking area where the communications apparatus, by subscription, is not allowed to operate, but when it should find another allowed tracking area or location area in the same PLMN or an equivalent PLMN. In another example, cause #25 means not authorized for this closed subscriber group (CSG). This cause is sent to the communications apparatus if it requests access, or if the network initiates a detach request, in a CSG cell with CSG ID where the communications apparatus either has no subscription to operate or the communications apparatus' subscription has expired and it should find another cell in the same PLMN or an equivalent PLMN.

For other reject cause values, reference may be made to ETSI 3GPP TS 24.301, and are omitted here for brevity.

In addition to the rejection of the attach request, the attach procedure may also fail due to an abnormal situation. There are several abnormal cases that can be identified. For example, abnormal case b) means a lower-layer failure or release of the NAS signaling connection without "Extended wait time" received from lower layers before the attach accept or attach reject message is received. In another example, abnormal case c) means T3410 timeout. In another example, abnormal case d) means any attach reject that is not specified in ETSI 3GPP TS 24.301 subclause 5.5.1.2.5. For other identified abnormal cases, reference may be made to ETSI 3GPP TS 24.301, and are omitted here for brevity.

Figure 5:
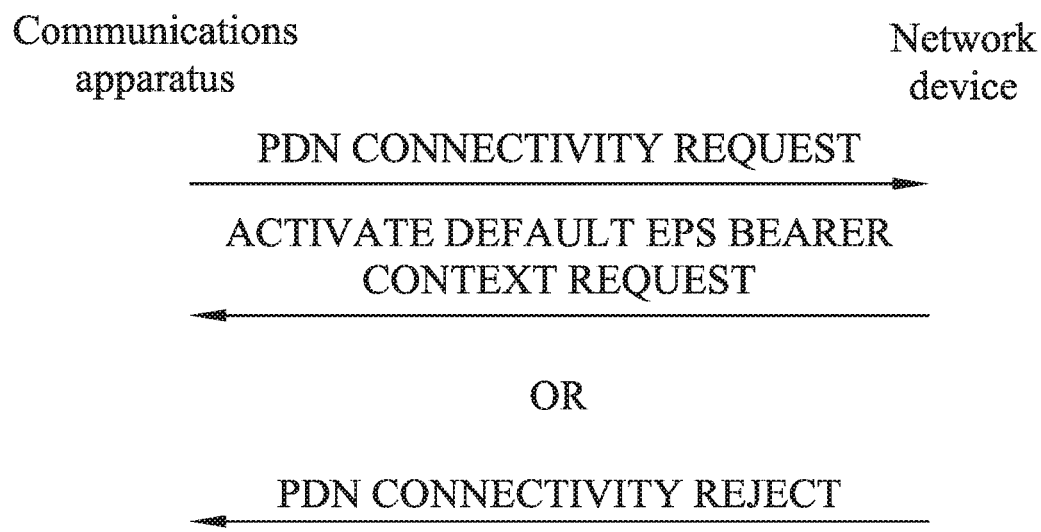
FIG. 5 is a flow chart showing a message flow for a PDN connectivity procedure to establish an emergency PDN connection.

FIG. 5 is a flow chart showing a message flow for a PDN connectivity procedure to establish an emergency PDN connection. In the procedure, the communications apparatus may transmit a PDN connectivity request message to a network device. The network device may reply by sending an activate default EPS bearer context request message or a PDN connectivity reject message to the communications apparatus. When the network device replies the PDN connectivity reject message to the communications apparatus, the emergency PDN establishment fails. For more detailed description of the PDN connectivity procedure, reference may be made to ETSI 3GPP TS 24.301, and are omitted here for brevity.

In addition to the emergency PDN connection establishment fail, the IMS registration as shown in FIG. 3 may also fail. The failure may be a Session Initiation Protocol (SIP) layer procedure fail, such as failure in a SIP registration procedure or failure in a call invite procedure, receiving a reject message, or others. For more detailed description of the IMS registration procedure, reference may be made to ETSI 3GPP TS 23.167, and are omitted here for brevity.

According to an embodiment of the invention, when the processor has attempted or tried but failed to establish an emergency call, the public land mobile network (PLMN) identity (ID), tracking area (TA) code, cell ID and/or CSG ID of one or more cells through which the processor has performed an emergency call attempt that has failed may be recorded in the low priority list.

Note that, in the embodiments of the invention, the emergency call attempt or the trial comprises the attempt or trial in the attach procedure as shown in FIGS. 4A and/or 4B, the attempt or trial in the PDN connectivity procedure as shown in FIG. 5, and the attempt or trial in the IMS registration procedure as discussed above.

Therefore, in the embodiments of the invention, the failure to establish an emergency call may be a failure of the attach procedure, such as the reception of an attempt reject message as shown in FIG. 4B, or an attach fail due to some abnormal situation as discussed above, a failure of the PDN connectivity procedure as discussed above, or a failure of the IMS registration procedure as discussed above.

With the information recorded in the low priority list, the communications apparatus may try to attach to a cell with a higher priority to avoid another failure to occur, and more efficient wireless communications services than conventional designs can be achieved.

Figure 6:
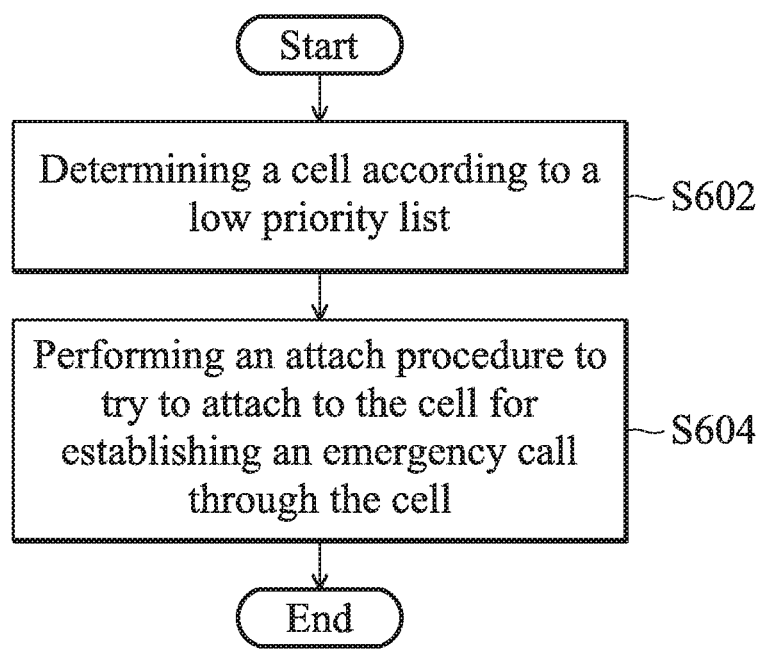
FIG. 6 is a flow chart showing a method for efficient wireless communications according to an embodiment of the invention.

FIG. 6 is a flow chart showing a method for efficient wireless communications according to an embodiment of the invention. When the communications apparatus (e.g. the communications apparatus 100A or 100B) has to perform a cell search procedure for establishing an emergency call, the processor (e.g. the processor 222) may first determine a cell according to a low priority list (Step S602) to select a cell with higher priority and perform an attach procedure to try to attach to the cell for establishing an emergency call through the cell (Step S604). According to an embodiment of the invention, the low priority list comprises information regarding a PLMN identity (ID), a TA code, a cell ID and/or a CSG ID of at least one attempted cell through which the communications apparatus has attempted but failed to establish an emergency call. The procedure to trigger an attach procedure is well-known in the art, and is omitted here for brevity.

In the embodiments of the invention, there are several priority search strategies that can be applied in step S602.

According to an embodiment of the invention, when the processor determines a cell in step S602, a cell with its PLMN ID, TA code (TAC), cell ID and CSG ID not in the low priority list is given highest precedence over any other cell whose PLMN ID, TA code, cell ID or CSG ID is in the low priority list. In this manner, the processor tries first to attach to the network which is not in the low priority list.

In addition, according to an embodiment of the invention, if there is no such cell with its PLMN ID, TAC, cell ID and CSG ID not in the low priority list, the priority of the cell with its PLMN ID in the low priority list is given higher than the priority than the cell with its TAC in the low priority list, and the priority of the cell with its TAC in the low priority list is given higher than the priority than the cell with its cell ID or its CSG ID in the low priority list.

For example, according to an embodiment of the invention, when the processor determines a cell in step S602, a cell with only its PLMN ID in the low priority list is given higher precedence over any other cell whose TAC, cell ID or CSG ID is in the low priority list.

In another example, according to another embodiment of the invention, when the processor determines a cell in step S602, a cell with its only its PLMN ID or TAC in the low priority list is given higher precedence over any other cell whose cell ID or CSG ID is in the low priority list.

In addition, according to an embodiment of the invention, if there is no such cell with its PLMN ID, TAC, cell ID and CSG ID not in the low priority list, the processor tries first to attach to the network with its PLMN ID, TAC, cell ID or CSG ID is the oldest record (that is, recorded earliest) in the low priority list.

For example, according to another embodiment of the invention, when the processor determines a cell in step S602, a cell whose PLMN ID was recorded earlier than those of other cells in the low priority list is given a higher priority than those other cells.

In another example, according to another embodiment of the invention, when the processor determines a cell in step S602, a cell whose TAC was recorded earlier than those of other cells in the low priority list is given a higher priority than those other cells.

In another example, according to another embodiment of the invention, when the processor determines a cell in step S602, a cell whose CSG ID was recorded earlier than those of other cells in the low priority list is given a higher priority than those other cells.

In yet another example, according to another embodiment of the invention, when the processor determines a cell in step S602, a cell whose cell ID was recorded earlier than those of other cells in the low priority list is given a higher priority than those other cells.

According to an embodiment of the invention, the low priority list may be a forbidden PLMN list and record the identity of at least one forbidden PLMN. Information regarding the forbidden PLMN may be obtained from a reject cause or a failure reason of a previous attempt to establish an emergency call. For example, when a previous attempt fails in the attach procedure with reject cause #11 or #14 indicated by the network, or it fails during the PDN connectivity procedure, or it fails during the IMS registration procedure, the PLMN ID of the cell may be recorded in the low priority list.

According to another embodiment of the invention, the low priority list may be a forbidden TA list and record the code of at least one forbidden TA. Information regarding the forbidden TA may be obtained from a reject cause or a failure reason of a previous attempt to establish an emergency call. For example, when a previous attempt fails in the attach procedure with reject cause #12, #13 or #15 indicated by the network, or it fails during the attach procedure due to abnormal case b), c), or d), the TAC of the attempted cell may be recorded in the low priority list.

According to an embodiment of the invention, the low priority list may be a CSG list and record the identity of at least one CSG. Information regarding the CSG may be obtained from a reject cause or a failure reason of a previous attempt to establish an emergency call. For example, when a previous attempt fails during the attach procedure with reject cause #25 indicated by the network, the CSG ID of the attempted cell may be recorded in the low priority list.

According to an embodiment of the invention, the low priority list may be a cell list and record the identity of at least one cell. Information regarding the cell may be obtained from a reject cause or a failure reason of a previous attempt to establish an emergency call. For example, when a previous attempt fails due to abnormal case b), c), or d), the cell ID of the attempted cell may be recorded in the low priority list.

Note that in some embodiments of the invention, the low priority list may be a combination of a forbidden PLMN, forbidden TA, cell ID and/or CSG list and record the identity of at least one forbidden PLMN, a code of at least one forbidden TA, the identity of at least one cell and/or the identity of at least one CSG. Therefore, the invention should not be limited to any specific implementation method.

FIG. 7 to FIG. 10 respectively show a more detailed flow chart of the method for efficient wireless communications according to an embodiment of the invention. In the embodiment, parameters m, M, n and N are introduced, where 'm' is a non-negative integer for counting the number of emergency call attempts, 'M' is a non-negative integer defining a maximum number of allowed emergency call attempts, 'n' is a non-negative integer for counting the number of abnormal failures, and 'N' is a non-negative integer defining the maximum number of times an abnormal failure is allowed.

Figure 7:
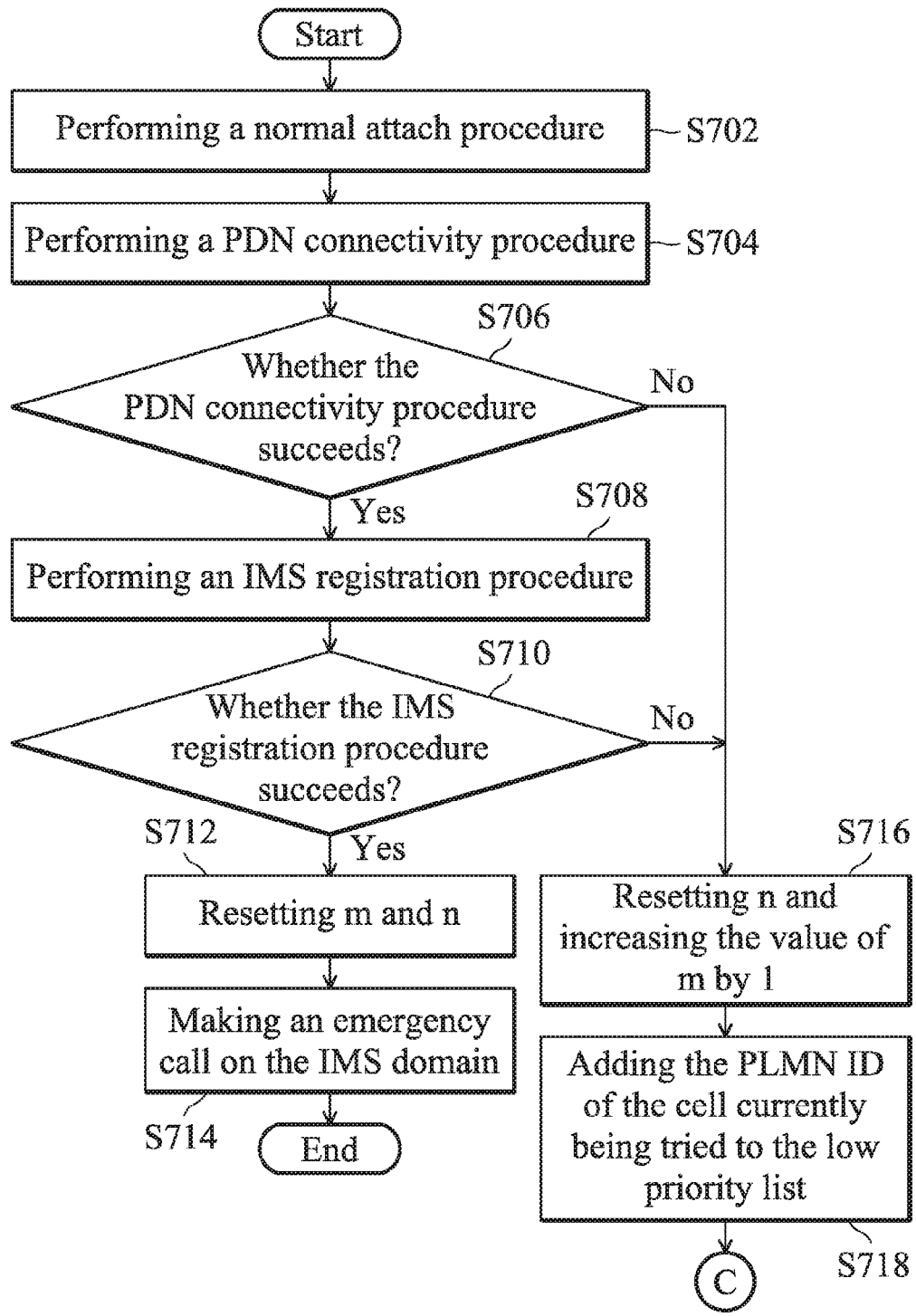
FIG. 7 is a more detailed flow chart showing the method for efficient wireless communications according to an embodiment of the invention.

Referring first to FIG. 7, the processor may perform a normal attach procedure in step S702 for attaching to bearer services and perform a PDN connectivity procedure in step S704 to establish an emergency PDN connection. The processor may determine whether the PDN connectivity procedure succeeds (Step S706). When the PDN connectivity procedure performed in step S704 succeeds, the processor may perform an IMS registration procedure (Step S708). The processor may further determine whether the IMS registration procedure succeeds (Step S710). When the IMS registration procedure performed in step S708 succeeds, the processor may reset the values of m and n (Step S712), and make an emergency call on the IMS domain (Step S714).

Figure 10:
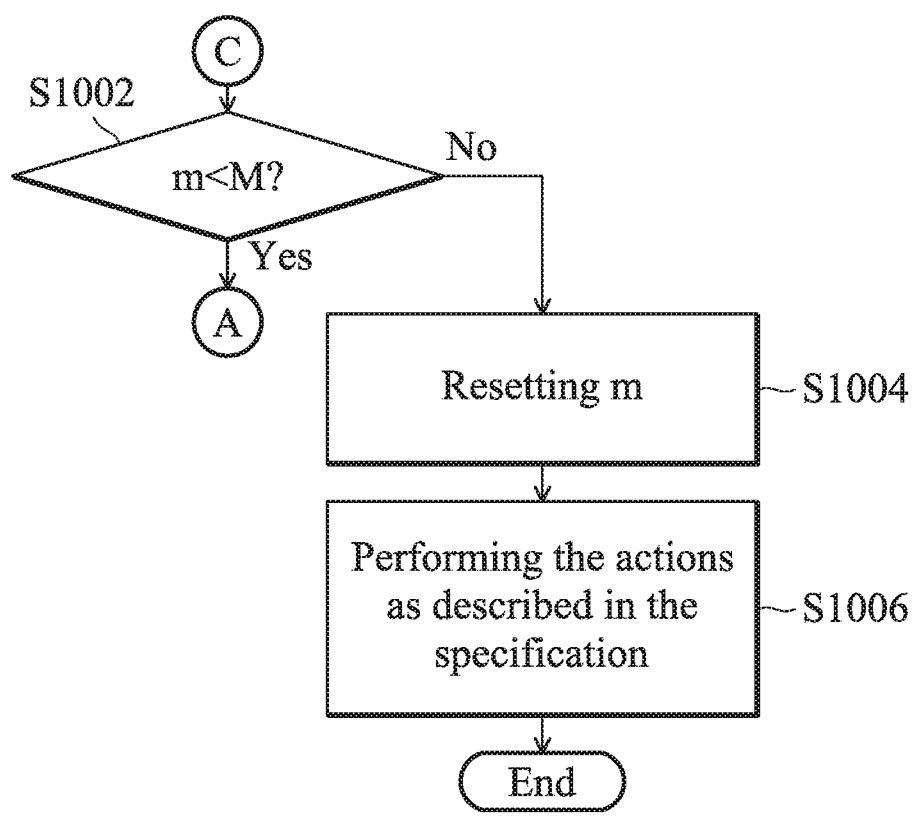
FIG. 10 is a more detailed flow chart showing the method for efficient wireless communications according to an embodiment of the invention.

When the PDN connectivity procedure performed in step S704 fails, or the IMS registration procedure performed in step S708 fails, the processor may reset the value of n and increase the value of m by 1 (that is, m++) (Step S716). The processor may also add the PLMN ID of the cell currently being tried to the low priority list (Step S718), and the process may be connected to the connection node C (the flow started from the connection node C is shown in FIG. 10).

Figure 8:
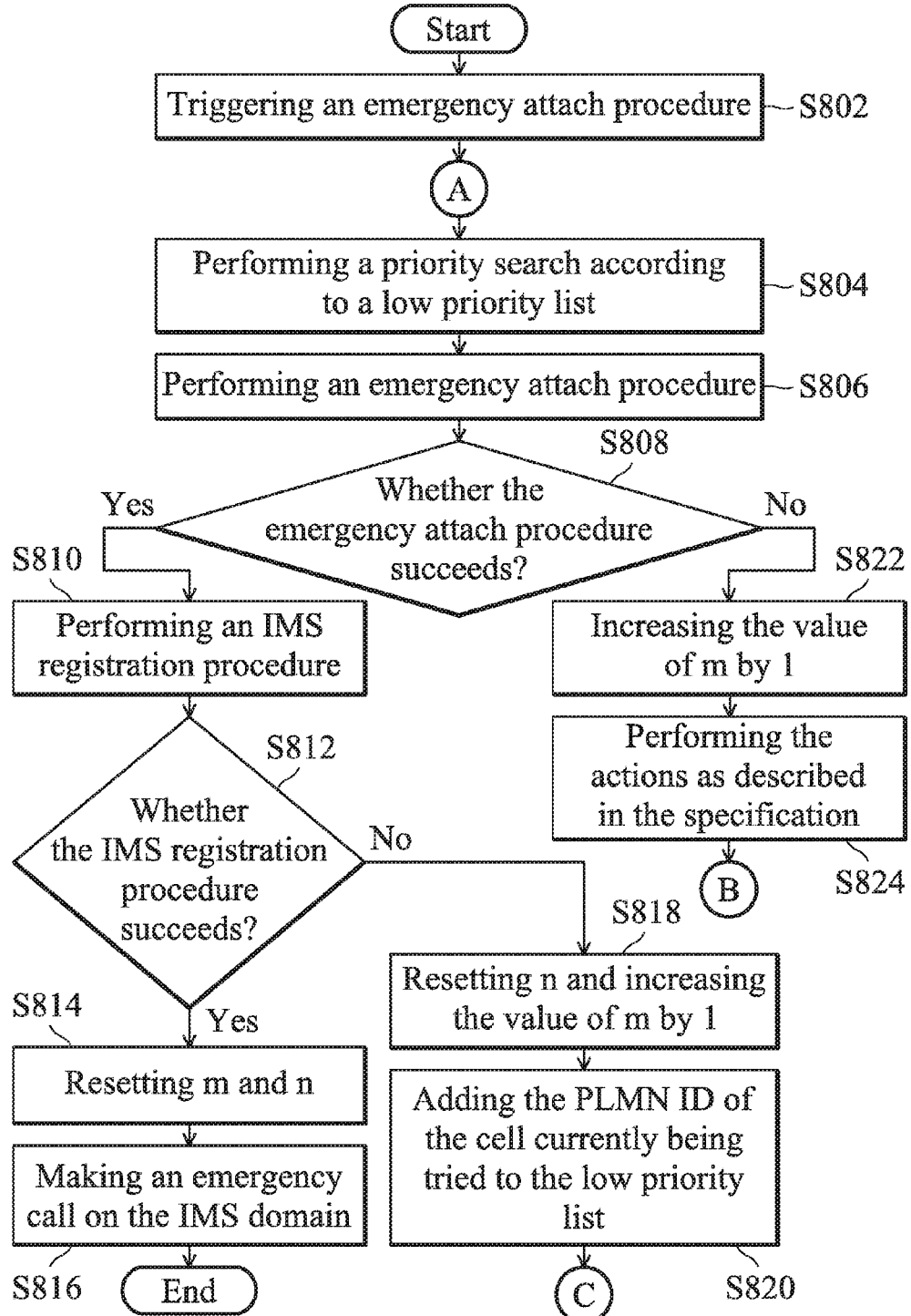
FIG. 8 is a more detailed flow chart showing the method for efficient wireless communications according to an embodiment of the invention.

Referring to FIG. 8, when an emergency attach procedure is triggered (Step S802) (for example, when the user dials an emergency number), a flow started from the connection node A may begin. The flow may begin to perform a priority search to determine a cell according to a low priority list (Step S804). The priority search may be performed based on one or more of the priority search strategies discussed above. After determining a suitable cell, the processor may perform an emergency attach procedure (Step S806) and determine whether the emergency attach procedure succeeds (Step S808).

When the emergency attach procedure succeeds, the processor may perform an IMS registration procedure (Step S810). The processor may further determine whether the IMS registration procedure succeeds (Step S812). When the IMS registration procedure performed in step S810 succeeds, the processor may reset the values of m and n (Step S814), and make an emergency call on the IMS domain (Step S816).

When the IMS registration procedure performed in step S810 fails, the processor may reset the value of n and increase the value of m by 1 (that is, m++) (Step S818). The processor may also add the PLMN ID of the cell currently being tried to the low priority list (Step S820) and the process may be connected to the connection node C (the flow started from the connection node C is shown in FIG. 10).

On the other hand, when the emergency attach procedure fails, the processor may increase the value of m by 1 (that is, m++) (Step S822). The processor may further perform the actions as described in the specification ETSI 3GPP TS 24.301 subclause 5.5.1.2.5A (Step S824) and the process may be connected to the connection node B (the flow started from the connection node B is shown in FIG. 9).

Figure 9:
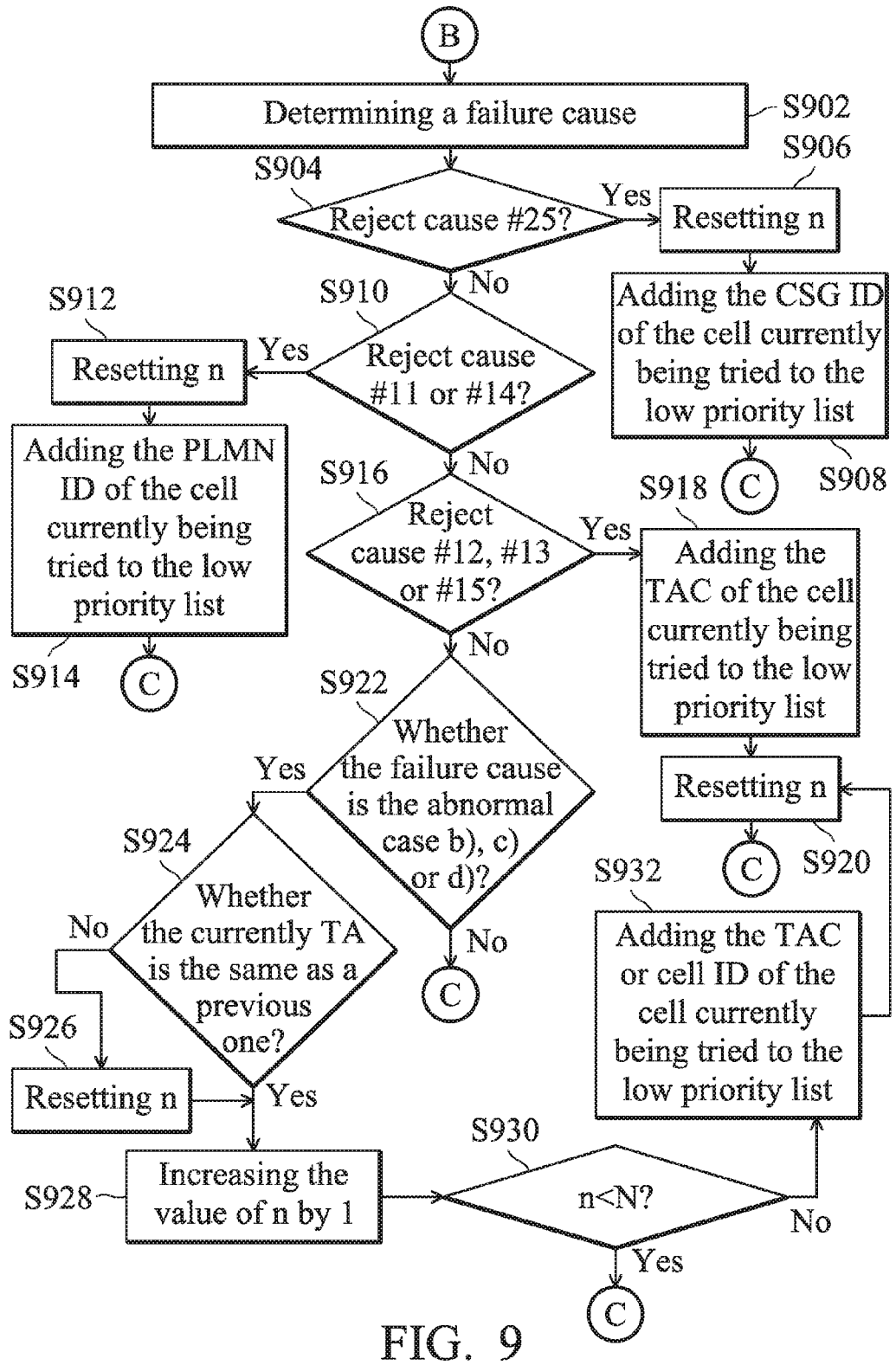
FIG. 9 is a more detailed flow chart showing the method for efficient wireless communications according to an embodiment of the invention.

Referring to FIG. 9, a flow started from the connection node B is shown. The processor may determine a cause of the failure of the emergency attach procedure (Step S902). The processor may determine the cause of the failure according to the reject cause carried in the attach reject message if it is received, or according to the cause of any abnormal failure in the emergency attach procedure, or the like.

The processor may determine whether the cause of the failure is reject cause #25 (Step S904). If so, the processor may reset the value of n (Step S906), add the CSG ID of the cell currently being tried to the low priority list (Step S908), and the process may be connected to the connection node C (the flow started from the connection node C is shown in FIG. 10).

If the cause of the failure is not reject cause #25, the processor may further determine whether the cause of the failure is reject cause #11 or #14 (Step S910). If so, the processor may reset the value of n (Step S912), add the PLMN ID of the cell currently being tried to the low priority list (Step S914) and the process may be connected to the connection node C (the flow started from the connection node C is shown in FIG. 10).

If the cause of the failure is not reject cause #11 or #14, the processor may determine whether the cause of the failure is reject cause #12, #13 or #15 (Step S916). If so, the processor may add the TAC of the cell currently being tried to the low priority list (Step S918), reset the value of n (Step S920) and the process may be connected to the connection node C (the flow started from the connection node C is shown in FIG. 10).

If the cause of the failure is not reject cause #12, #13 or #15, the processor may determine whether the cause of the failure is abnormal case b), c) or d) (Step S922). If not, the process may be connected to the connection node C (the flow started from the connection node C is shown in FIG. 10). If so, the processor may determine whether the TA of the cell currently being tried is the same as the TA of a previously attempted cell (Step S924). If not, the processor may reset the value of n (Step S926), and increase the value of n by 1 (Step S928). After increasing the value of n, the processor may determine whether n<N (Step S930). If n<N, the process may be connected to the connection node C (the flow started from the connection node C is shown in FIG. 10). If n=N, the processor may add the TAC or the cell ID of the cell currently being tried to the low priority list (Step S932), reset the value of n (Step S920), and the process may be connected to the connection node C (the flow started from the connection node C is shown in FIG. 10).

If the TA of the cell that is currently being tried is the same as the TA of a previously attempted cell (the yes path of Step S924), the processor may increase the value of n by 1 (Step S928). The processor may further determine whether n<N (Step S930). If n<N, the process may be connected to the connection node C (the flow started from the connection node C is shown in FIG. 10). If n=N, the processor may add the TAC or the cell ID of the cell currently being tried to the low priority list (Step S932), reset the value of n (Step S920) and the process may be connected to the connection node C (the flow started from the connection node C is shown in FIG. 10).

Note that in Step S932, the processor may add the TAC or the cell ID of the cell currently being tried to the low priority list. When the cell ID of the cell currently being tried is recorded and the abnormal failures are always occurred in the same cell, the subsequent emergency attach procedure may still be successful when the processor skips this cell and tries another cell under the same TA.

Referring to FIG. 10, a flow started from the connection node C is shown. The processor may determine whether m<M (Step S1002). If so, the process may be connected to the connection node A (the flow started from the connection node A is shown in FIG. 8). If not, which means m=M, the processor may reset the value m (Step S1004) and perform the actions described in the specification ETSI 3GPP TS 24.301 subclause 5.5.1.2.5A (Step S1006).

According to an embodiment of the invention, the processer may maintain the low priority list by erasing records when needed. For the PLMN ID in the low priority list, the processer may periodically erase a record of the PLMN ID of a cell from the low priority list, or when the communications apparatus is powered off, or when a subscriber identity card (e.g. the subscriber identity card 140 or 145) is removed. According to another embodiment of the invention, the processer may also erase a record of the PLMN ID of a cell from the low priority list when a subscriber identity card is plugged in. According to yet another embodiment of the invention, the processor may also erase a record of the PLMN ID of a cell from the low priority list when the processor has successfully established an emergency call through the cell.

According to another embodiment of the invention, for the TAC in the low priority list, the processer may periodically erase a record of the TAC of a cell from the low priority list, or when the communications apparatus is powered off, or when a subscriber identity card (e.g. the subscriber identity card 140 or 145) is removed. According to another embodiment of the invention, the processor may also erase a record of the TAC of a cell from the low priority list when a subscriber identity card is plugged in. According to yet another embodiment of the invention, the processor may also erase a record of the TAC of a cell from the low priority list when the processor has successfully established an emergency call through the cell.

According to another embodiment of the invention, the processer may also erase a record of the TAC of one or more valid TA(s) from the low priority list when receiving a list of valid TA(s). The list of valid TA(s) may be received in the attach procedure, in the tracking area update procedure, or in a GUTI reallocation procedure in a normal or emergency attach procedure, etc.

According to an embodiment of the invention, for the CSG ID in the low priority list, the processer may periodically erase a record of the CSG ID of a cell from the low priority list, or when the communications apparatus is powered off, or when a subscriber identity card (e.g. the subscriber identity card 140 or 145) is removed. According to another embodiment of the invention, the processor may also erase a record of the CSG ID of a cell from the low priority list when a subscriber identity card is plugged in. According to yet another embodiment of the invention, the processor may also erase a record of the CSG ID of a cell from the low priority list when the processor has successfully established an emergency call through the cell.

According to an embodiment of the invention, for the cell ID in the low priority list, the processor may periodically erase a record of the cell ID of a cell from the low priority list, or when the communications apparatus is powered off, or when a subscriber identity card (e.g. the subscriber identity card 140 or 145) is removed. According to another embodiment of the invention, the processor may also erase a record of the cell ID of a cell from the low priority list when a subscriber identity card is plugged in. According to yet another embodiment of the invention, the processor may also erase a record of the cell ID of a cell from the low priority list when the processor has successfully established an emergency call through the cell.

By applying the methods discussed above, the communications apparatus may first try to attach to a cell with a higher priority to avoid another failure to occur again when making an emergency call. Usually, a cell with its PLMN ID, TA code (TAC) and CSG ID not in the low priority list is given the highest priority. In this manner, more efficient wireless communications services than conventional designs can be achieved.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a radio transceiver, transmitting or receiving wireless radio frequency signals; and
a processor, determining a cell according to a low priority list and performing an attach procedure via the radio transceiver to try to attach to the cell for establishing an emergency call through the cell,
wherein the low priority list comprises information regarding a public land mobile network (PLMN) identity (ID), a tracking area (TA) code, a cell ID and/or a closed subscriber group (CSG) ID of at least one attempted cell through which the processor has attempted but failed to establish an emergency call, and
wherein when the processor determines the cell, a cell with only its PLMN ID or TA code in the low priority list is given precedence over any other cell whose cell ID or CSG ID is in the low priority list.

2. The communications apparatus as claimed in claim 1, wherein when the processor determines the cell, a cell with its PLMN ID, TA code, cell ID and CSG ID not in the low priority list is given precedence over any other cell whose PLMN ID, TA code or CSG ID is in the low priority list.

3. The communications apparatus as claimed in claim 1, wherein when the processor determines the cell, a cell with only its PLMN ID in the low priority list is given precedence over any other cell whose TA code, cell ID or CSG ID is in the low priority list.

4. The communications apparatus as claimed in claim 1, wherein the low priority list records an identity of at least one forbidden PLMN, wherein information regarding the forbidden PLMN is obtained from a reject cause or a failure reason of a previous attempt to establish an emergency call.

5. The communications apparatus as claimed in claim 1, wherein the low priority list records a TA code of at least one forbidden TA, wherein information regarding the forbidden TA is obtained from a reject cause or a failure reason of a previous attempt to establish an emergency call.

6. The communications apparatus as claimed in claim 1, wherein the low priority list records an identity of at least one CSG, wherein information regarding the CSG is obtained from a reject cause or a failure reason of a previous attempt to establish an emergency call.

7. The communications apparatus as claimed in claim 1, wherein the low priority list records an identity of at least one cell, wherein information regarding the cell is obtained from a reject cause or a failure reason of a previous attempt to establish an emergency call.

8. The communications apparatus as claimed in claim 1, wherein the processor erases a record of the PLMN ID, TA code, cell ID and/or CSG ID of a cell from the low priority list when the processor has successfully established an emergency call through the cell.

9. The communications apparatus as claimed in claim 1, further comprising:
a subscriber identity card,
wherein the processor erases a record of the PLMN ID, TA code, cell ID and/or CSG ID of a cell from the low priority list when the subscriber identity card is removed or plugged in.

10. A method for efficient wireless communications, performed by a communications apparatus, comprising:
determining a cell according to a low priority list; and
performing an attach procedure to try to attach to the cell for establishing an emergency call through the cell,
wherein the low priority list comprises information regarding a public land mobile network (PLMN) identity (ID), a tracking area (TA) code, a cell ID and/or a closed subscriber group (CSG) ID of at least one attempted cell through which the communications apparatus has attempted but failed to establish an emergency call, and
wherein in the determining step, a cell with only its PLMN ID or TA code in the low priority list is given precedence over any other cell whose cell ID or CSG ID is in the low priority list.

11. The method as claimed in claim 10, wherein in the determining step, a cell with its PLMN ID, TA code, cell ID and CSG ID not in the low priority list is given precedence over any other cell whose PLMN ID, TA code, cell ID or CSG ID is in the low priority list.

12. The method as claimed in claim 10, wherein in the determining step, a cell with only its PLMN ID in the low priority list is given precedence over any other cell whose TA code, cell ID or CSG ID is in the low priority list.

13. The method as claimed in claim 10, wherein the low priority list records an identity of at least one forbidden PLMN, wherein information regarding the forbidden PLMN is obtained from a reject cause or a failure reason of a previous attempt of the communications apparatus to establish an emergency call.

14. The method as claimed in claim 10, wherein the low priority list records a TA code of at least one forbidden TA, wherein information regarding the forbidden TA is obtained from a reject cause or a failure reason of a previous attempt of the communications apparatus to establish an emergency call.

15. The method as claimed in claim 10, wherein the low priority list records an identity of at least one CSG, wherein information regarding the CSG is obtained from a reject cause or a failure reason of a previous attempt of the communications apparatus to establish an emergency call.

16. The method as claimed in claim 10, wherein the low priority list records an identity of at least one cell, wherein information regarding the cell is obtained from a reject cause or a failure reason of a previous attempt of the communications apparatus to establish an emergency call.

17. The method as claimed in claim 10, further comprising:
   erasing a record of the PLMN ID, TA code, cell ID and/or CSG ID of a cell from the low priority list when the communications apparatus has successfully established an emergency call through the cell.

18. The method as claimed in claim 10, further comprising:
   erasing a record of the PLMN ID, TA code, cell ID and/or CSG ID of a cell from the low priority list when a subscriber identity card of the communications apparatus is removed or plugged in.

\* \* \* \* \*